United States Patent Office.

ALONZO FARRAR, OF BOSTON, MASSACHUSETTS.

Letters Patent No. 96,409, dated November 2, 1869.

IMPROVED PROCESS OF PRODUCING CARBON PIGMENTS.

The Schedule referred to in these Letters Patent and making part of the same

*To all whom it may concern:*

Be it known that I, ALONZO FARRAR, of the city of Boston, in the State of Massachusetts, have invented a new and useful Process for Producing Carbon Pigments, of which the following is a specification.

The object of my invention is to utilize the spent acids from oil-refineries, or the acids that have been used in refining petroleum, which have generally been accounted of no value; also, coal-tar, common tar, heavy carbon-oils, and hydrocarbons, and to produce therefrom pigments, which may be applied to a variety of useful purposes.

To produce the pigment, I take any desired or suitable quantity of the spent acid, after it has been used in an oil-refinery, which I dilute with a suitable quantity of common water, and then agitate it, for the purpose of separating the tar or oily substance from the acid-water. I then evaporate the latter to about 62°, after which I again dilute it with a suitable quantity of water, by which means a very fine black powder is thrown down or precipitated. I then siphon off the diluted acid, and wash the powder, so as to draw the acid therefrom, after which I dry it, thus forming the pigment, and completing the process.

Another method by which I produce the pigment is as follows:

I take a suitable quantity of the before-mentioned spent acid, and put it into a suitable pan or still, and apply heat gradually to near the boiling-point, by which means a chemical change is effected, by the action of the acid upon the tar, which thereby becomes carbonized, and, by means of further agitation, separates from the acid in masses. I then draw off the excess of acid. The residuum forms the foundation for the pigment, from which I take off the acid, either by still continuing the application of heat, but in greater degree than before, and sufficient to drive off the acid entirely, thereby leaving the pigment dry, and ready for grinding, or by crushing the foundation (already mentioned) in water, while in mass, then drawing off the acid by means of water, and afterward evaporating, by means of heat, until the pigment becomes dry.

Common tar, also, and coal-tar, may be neutralized by sulphuric acid of suitable strength for the purpose, so as to produce a similar pigment; and the pigment may also be produced directly from heavy carbon-oil, and any of the hydrocarbons, either crude or distilled, by the use of sulphuric acid combined with heat, in the manner above described.

Having thus described my invention,

What I claim as new, and desire to secure by Letters Patent of the United States, is—

A pigment made from the spent acids of oil-refineries, common tar, coal-tar, carbon-oil, and all hydrocarbons, by a process substantially as herein shown and described.

ALONZO FARRAR.

Witnesses:
JOHN S. THORNTON,
F. F. FARRAR.